(12) United States Patent
Xu et al.

(10) Patent No.: US 11,965,647 B1
(45) Date of Patent: Apr. 23, 2024

(54) LED PLANT GROWING LAMP

(71) Applicant: SHENZHEN SNC OPTO ELECTRONIC CO., LTD, Shenzhen (CN)

(72) Inventors: Jianjun Xu, Shenzhen (CN); Liang Qiu, Shenzhen (CN); Xican Huang, Shenzhen (CN); Jianyong Xu, Shenzhen (CN)

(73) Assignee: SHENZHEN SNC OPTO ELECTRONIC CO., LTD, Shenzhen (CN)

( * ) Notice: Subject to any disclaimer, the term of this patent is extended or adjusted under 35 U.S.C. 154(b) by 0 days.

(21) Appl. No.: 18/204,392

(22) Filed: Jun. 1, 2023

(30) Foreign Application Priority Data

Dec. 11, 2022 (CN) .......................... 202211587004.5

(51) Int. Cl.
| | |
|---|---|
| *F21V 29/74* | (2015.01) |
| *A01G 7/04* | (2006.01) |
| *A01G 9/24* | (2006.01) |
| *F21V 23/00* | (2015.01) |
| *F21Y 105/10* | (2016.01) |
| *F21Y 115/10* | (2016.01) |

(52) U.S. Cl.
CPC .............. *F21V 29/74* (2015.01); *A01G 7/045* (2013.01); *A01G 9/249* (2019.05); *F21V 23/004* (2013.01); *F21V 23/007* (2013.01); *F21Y 2105/10* (2016.08); *F21Y 2115/10* (2016.08)

(58) Field of Classification Search
CPC ...... F21V 23/007; F21V 23/004; F21V 29/74; A01G 7/045; A01G 9/249
See application file for complete search history.

(56) References Cited

U.S. PATENT DOCUMENTS

| | | | |
|---|---|---|---|
| 10,012,375 B1* | 7/2018 | Salessi .................. | F21V 29/503 |
| 10,386,058 B1* | 8/2019 | Cattoni ................. | F21V 29/763 |
| 11,668,457 B1* | 6/2023 | Luo ......................... | F21V 29/67 362/294 |
| 2017/0108184 A1* | 4/2017 | Brannon ................. | F21V 29/74 |
| 2017/0184285 A1* | 6/2017 | Visser ................... | F21V 23/008 |
| 2020/0309332 A1* | 10/2020 | Yang ...................... | F21S 8/026 |

\* cited by examiner

*Primary Examiner* — Christopher E Dunay

(57) ABSTRACT

The present disclosure provides an LED plant growing lamp including a power supply, a plurality of LED modules, and a frame including four connecting rods and two end caps; each LED module including a heat sink, an LED light board and a junction box installed on the heat sink; each two of the four connecting rods arranged opposite each other and connected through a corresponding end cap to form a rectangular frame, the two end caps respectively arranged at both ends of the connecting rod; the power supply electrically connected with the junction box, the junction box electrically connected with the LED light board; the plurality of LED modules arranged in a row and sequentially installed on the four connecting rods, and received in the rectangular frame, thereby adjusting different luminous quantities and reducing R&D costs without needing to set heat sinks with different structures according to different luminous quantities.

10 Claims, 4 Drawing Sheets

LED PLANT GROWING LAMP

1. CROSS-REFERENCE TO RELATED APPLICATION

This application claims priority to Chinese Patent Application No. 202211587004.5, entitled "LED PLANT GROWING LAMP" and filed on Dec. 11, 2022, the content of which is hereby incorporated by reference in its entirety.

BACKGROUND

2. Technical Field

The present disclosure generally relates to the field of lighting technologies, and especially relates to an LED plant growing lamp.

3. Description of Related Art

LED plant growth lamps can be used to provide light required by photosynthesis for plants planted indoors. A conventional LED plant lamp usually includes a heat sink, a power supply installed on the heat sink and at least one LED light board. Once the heat sink is designed, a shape of an LED plant lamp is also basically determined. The number of LED light boards that can be set on the LED plant lamp depends on a size of the heat sink, in this way, once the number of LED light boards can no longer be adjusted, luminous quantity of the LED plant lamp can't be adjusted. If needing to adjust the luminous quantity of the whole LED plant lamp, other heat sinks of different sizes need to be re-developed; however, because the heat sink is complex, a long time and a high cost of research and development are occurred, which will lead to a significant increase in research and development costs and production costs.

SUMMARY

The technical problems to be solved: in view of the shortcomings of the related art, the present disclosure provides an LED plant growing lamp which can provide a frame to fix a plurality of LED modules that is sequentially arranged in a row, adjust the number of LED modules to adjust different luminous quantities, have a simple structure, and reduce R&D costs without needing to set heat sinks with different structures according to different luminous quantities.

An LED plant growing lamp according to an embodiment of the present disclosure includes: a power supply, a frame and a plurality of LED modules, each of the plurality of LED modules including a heat sink, an LED light board and a junction box installed on the heat sink, respectively; the frame including four connecting rods and two end caps, each two of the four connecting rods arranged opposite each other and connected through a corresponding end cap so that the four connecting rods are cooperatively to form a rectangular frame thereamong, and the two end caps respectively arranged at both ends of the rectangular frame; the power supply electrically connected with the junction box, and the junction box electrically connected with the LED light board; and wherein the plurality of LED modules is arranged in a row and sequentially installed on the four connecting rods, and received in the rectangular frame; and wherein the heat sink includes a base and a plurality of cooling fins integrally connected with an upper surface of the base, the junction box installed on the upper surface of the base, and the LED light board installed on a lower surface of the base; and wherein the junction box further includes a first wiring hole and a first connecting portion respectively arranged on a top wall of the junction box, the first connecting portion received in the first wiring hole; the power supply and the frame arranged separately and independently, the power supply including a second connecting portion connected to the first connecting portion through a wire; and wherein a first sealing ring is arranged between the junction box and the heat sink; and wherein the interior of the junction box is divided into a middle cavity and two side cavities arranged on both sides of the middle cavity, the wire passing through the middle cavity and connected to the LED light board, a reinforcing rib arranged in each of the two side cavities and connected to a sidewall of the middle cavity and a top wall of the junction box.

Wherein each of the four connecting rods is an L-shaped structure and includes a first wall and a second wall perpendicularly connected with the first wall, both the first wall and the second wall fitted with the plurality of LED modules.

Wherein the junction box and the base are connected with each other by screws.

Wherein the junction box is a box body with an opening thereof, and the opening arranged towards the upper surface of the base.

Wherein each of the plurality of LED modules includes a lens plate covered on the LED light board and fixedly installed on the heat sink.

Wherein a second sealing ring is arranged between the lens plate and the heat sink.

Wherein the base includes a second wiring hole arranged corresponding to the junction box, and the first sealing ring arranged between a cavity wall of the middle cavity and the base, and surrounding the second wiring hole.

Wherein two of the four connecting rods that are arranged at the top of the frame are connected to the reinforcing rib through screws.

Wherein a second sealing ring is arranged between the lens plate and the heat sink.

Wherein the LED plant growing lamp further includes a hanger rod, the frame hung on the hanger rod through at least two first hooks, the power supply hung on the hanger rod through at least two second hooks, and the frame and the power supply spaced at interval.

Wherein each of the two end caps includes a first hooking hole configured to hook the first hook.

The present disclosure provides the advantages as below: the present disclosure provides the frame to fix the plurality of LED modules that is arranged in a row and sequentially installed on the four connecting rods, adjust the number of LED modules to adjust different luminous quantities, have a simple structure, and reduce R&D costs without needing to set heat sinks with different structures according to different luminous quantities.

BRIEF DESCRIPTION OF THE DRAWINGS

In order to more clearly understand the technical solution hereinafter in embodiments of the present disclosure, a brief description to the drawings used in detailed description of embodiments hereinafter is provided thereof. Obviously, the drawings described below are some embodiments of the present disclosure, for one of ordinary skill in the related art, other drawings can be obtained according to the drawings below on the premise of no creative work.

Figure 1:
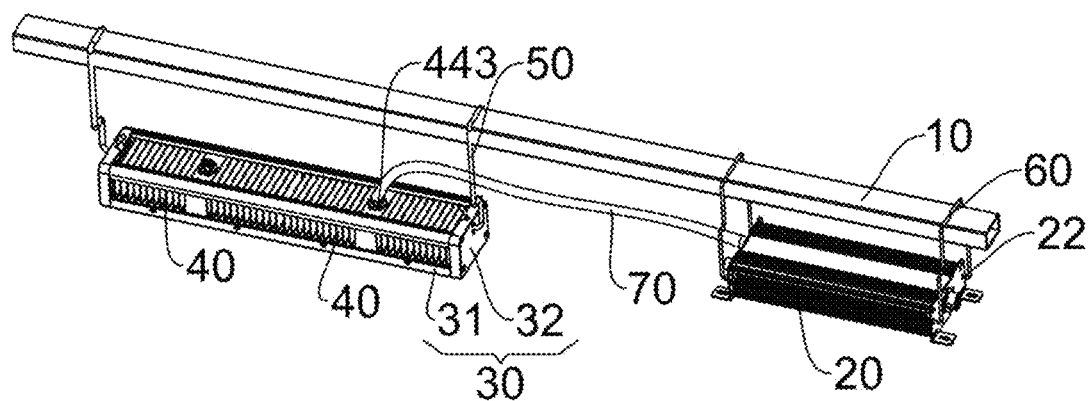
FIG. 1 is a schematic view of an LED plant growing lamp in accordance with an embodiment of the present disclosure.
Figure 2:
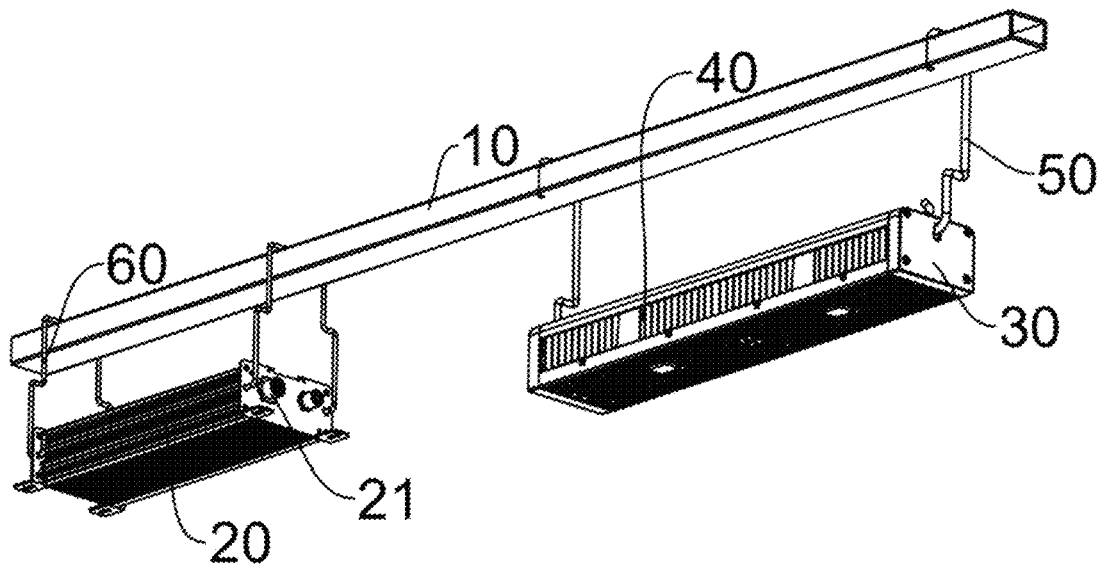
FIG. 2 is similar to FIG. 1, but shown from another view.
Figure 3:
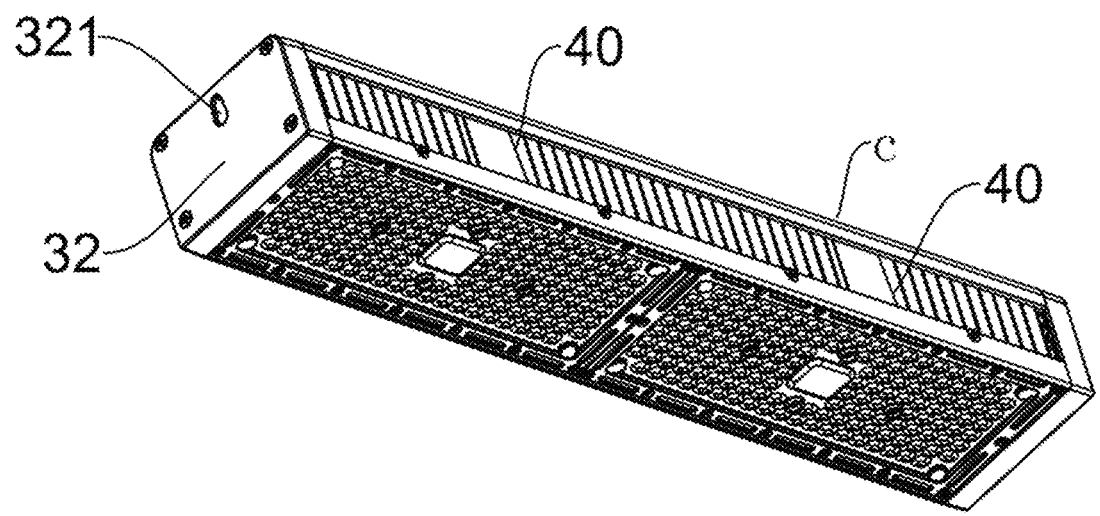
FIG. 3 is a partial view of the LED plant growing lamp of FIG. 1.
Figure 4:
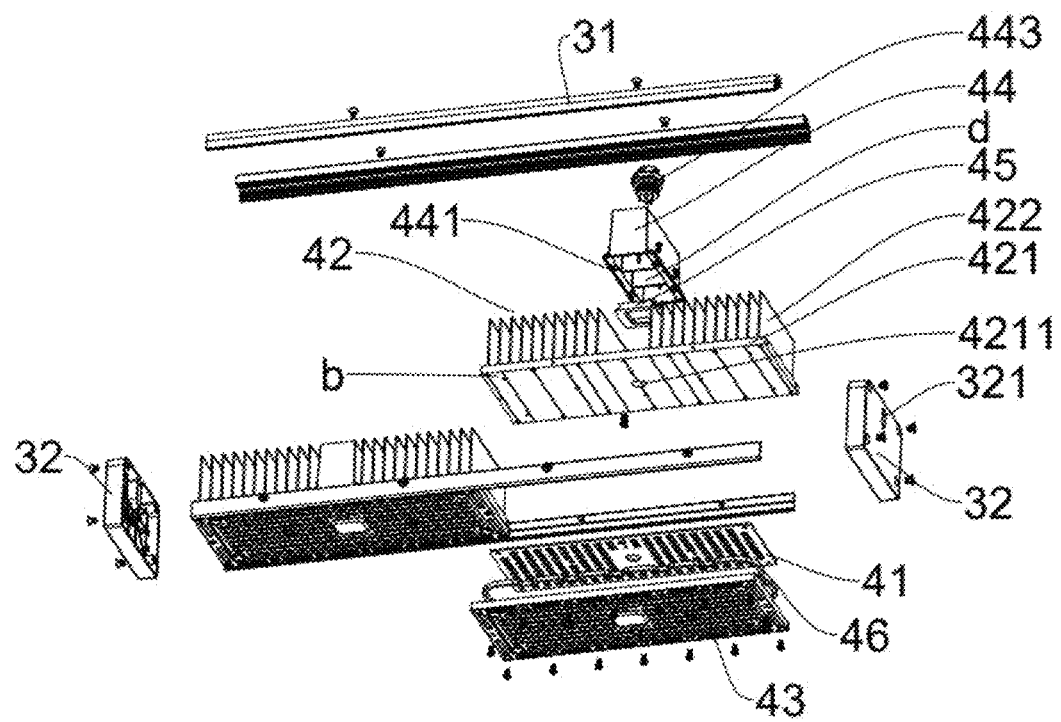
FIG. 4 is an exploded, schematic view of the LED plant growing lamp of FIG. 3.
Figure 5:
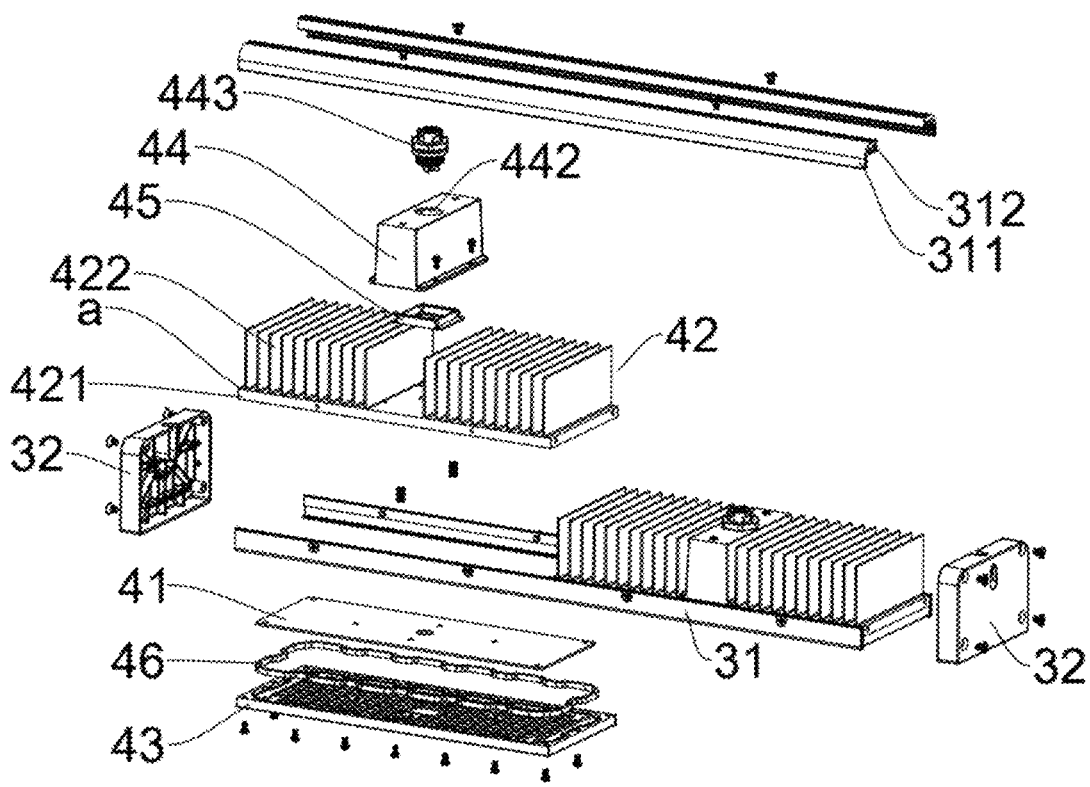
FIG. 5 is similar to FIG. 4, but shown from another view.

The element labels according to the embodiments of the present disclosure are as below:

10 hanger rod, 20 power supply, 21 second connecting portion, 22 second hooking hole, 30 frame, c rectangular frame, 31 connecting rod, 311 first wall, 312 second wall, 32 end cap, 321 first hooking hole, 40 LED module, 41 LED light board, 42 heat sink, 421 base, 4211 second wiring hole, a upper surface, b lower surface, 422 cooling fin, 43 lens plate, 44 junction box, 441 flanging, 442 first wiring hole, 443 first connecting portion, 444 middle cavity, 4441 sidewall, 4442 cavity wall, 445 side cavity, 446 reinforcing rib, 447 top wall, d opening, 45 first sealing ring, 46 second sealing ring, 50 first hook, 60 second hook, 70 wire.

DETAILED DESCRIPTION

Reference will now be made in detail to embodiments, examples of which are illustrated in the accompanying drawings. In the following detailed description, numerous specific details are set forth in order to provide a thorough understanding of the subject matter presented herein. Obviously, the implementation embodiment in the description is a part of the present disclosure implementation examples, rather than the implementation of all embodiments, examples. According to the described exemplary embodiment of the present disclosure, all other embodiments obtained by one of ordinary skill in the related art on the premise of no creative work are within the protection scope of the present disclosure.

It should also be understood that the terms used in the specification of the present disclosure are only for the purpose of describing specific embodiments without being intended to limit the present disclosure. As used in the description of the present disclosure and the appended claims, terms of "one", "one" and "the" in a singular form are intended to include a plural form unless the context clearly indicates otherwise.

It should also be further understood that the term "and/or" used in the description of the present disclosure and the appended claims refers to any combination of one or more of associated listed items and all possible combinations, and includes these combinations.

Referring to FIGS. 1-7, an LED plant growing lamp in accordance with an embodiment of the present disclosure includes a hanger rod 10, a power supply 20, a frame 30 and a plurality of LED modules 40. The power supply 20 is hung on the hanger rod 10 through at least two second hooks 60, and the frame 30 is hung on the hanger rod 10 through at least two first hooks 50. The plurality of LED modules 40 installed in the frame 30. Each of the plurality of LED modules 40 includes an LED light board 41, a heat sink 42, a lens plate 43 and a junction box 44. Both the LED light board 41 and the junction box 44 are installed on the heat sink 42, the lens plate 43 covered on the LED light board 41 and fixed on the heat sink 42. The power supply 20 is electrically connected with the junction box 44, and the junction box 44 is electrically connected with the LED light board 41 for supplying power to the LED light board 41 to illuminate plants. The frame 30 and the power supply 20 are spaced with each other at interval, which is conducive to ventilation and heat dissipation of the plurality of LED modules 40 and the power supply 20, thereby improving a lifespan thereof.

The frame 30 includes four connecting rods 31 and two end caps 32, each two of the four connecting rods 31 are arranged opposite each other and connected through a corresponding end cap 32 so that the four connecting rods 31 are cooperatively to form a rectangular frame c thereamong. Specifically, two of the four connecting rods 31 are spaced on a same plane, and the other two of the four connecting rods 31 are spaced on another plane below or above the previous two of the four connecting rods 31, so that the four connecting rods 31 are cooperatively to form the rectangular frame c. The two end caps 32 are respectively arranged at both ends of the four connecting rods 31 so that the four connecting rods 31 and the two end caps 32 are connected as a whole. The four connecting rods 31 and the two end caps 32 are fixed by screws. The plurality of LED modules 40 is arranged in a row and sequentially installed in the rectangular frame c along a length of the four connecting rods 31. The plurality of LED modules 40 is fixed with the rectangular frame c by screws. For example, the LED module 40 is placed into the rectangular frame c, holes are set in the heat sink 42 and the four connecting rods 31, and the screws successively pass through the four connecting rod 31 and the heat sink 42 from the outside to the inside so as to fix the LED module 40 with the frame 30.

Figure 6:
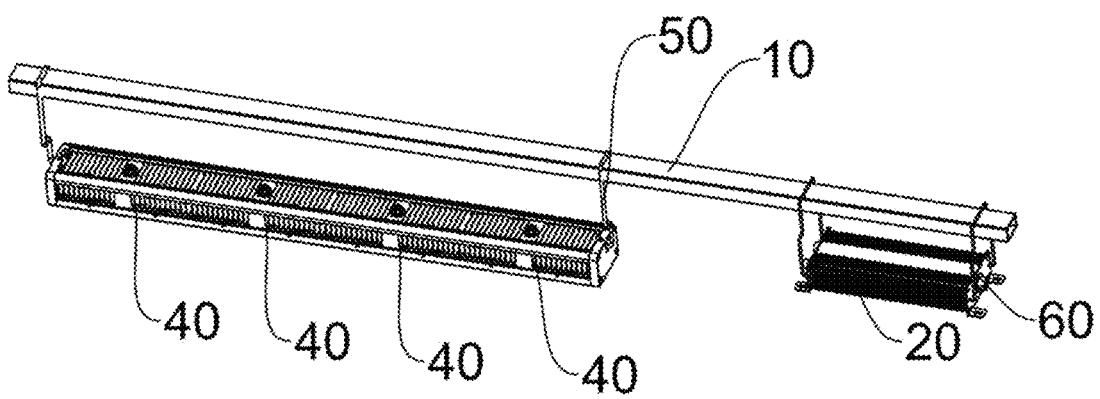
FIG. 6 is a schematic view of an LED plant growing lamp in accordance with another embodiment of the present disclosure.

The present disclosure can fix the plurality of LED modules 40 arranged in the same row through the frame 30. By adjusting the number of LED modules 40, different luminous quantities can be adjusted to meet needs of different luminous quantities, at the same time, the structure is simple, and there is no need to re-design the heat sinks with different structures in order to adapt to different luminous quantities, so as to achieve an effect of reducing research and development costs. Referring to FIGS. 1-5, the LED plant growing lamp consists of two LED modules 40 arranged in sequence along the length of the connecting rod 31. While, the LED plant growing lamp as shown in FIG. 6 includes four LED modules 40 arranged in sequence along the length of the connecting rod 31. It is understandable that the number of LED modules 40 can be others.

In an optional embodiment of the present disclosure, the connecting rod 31 is L-shaped and includes a first wall 311 and a second wall 312 perpendicularly connected with the first wall 311, and the first wall 311 and the second wall 312 are respectively connected with two adjacent surfaces of the LED module 40.

In an optional embodiment of the present disclosure, the heat sink 42 includes a base 421 and a plurality of cooling fins 422 integrally connected with an upper surface a of the base 421, the junction box 44 installed on the upper surface a of the base 421, and the LED light board 41 installed on a lower surface b of the base 421. The junction box 44 is installed in the middle of the upper surface a of the heat sink 42, and the plurality of cooling fins 422 is arranged on both sides of the junction box 44. In the embodiment of the present disclosure, the plurality of cooling fins 422 is arranged in parallel intervals. The junction box 44 is a box body with an opening d thereof, and the opening d arranged towards the upper surface a of the base 421, so as to protect electrical components within the junction box 44. The junction box 44 includes a flanging 441 arranged at the opening d, and parallel to the base 421. The junction box 44 can be detachably connected with the base 421 by the screws passing through the flanging 441.

In some embodiments of the present disclosure, a first sealing ring 45 is arranged between the base 421 of the heat sink 42 and the junction box 44, thereby a waterproof effect can be obtained by setting the first sealing ring 45. A second sealing ring 46 is also arranged between the lens plate 43 and the heat sink 42 to further waterproof the LED light board 41 through the second sealing ring 46.

The interior of the junction box 44 is divided into a middle cavity 444 and two side cavities 445 arranged on both sides of the middle cavity 444, the wire 7 passing through the middle cavity 444 and connected to the LED light board 41, a reinforcing rib 446 arranged in each of the two side cavities 445 and connected to a sidewall 4441 of the middle cavity 444 and a top wall 447 of the junction box 44.

In an optional embodiment of the present disclosure, the junction box 44 includes a first wiring hole 442 and a first connecting portion 443 respectively arranged on the top wall 447 of the junction box 444, the first connecting portion 446 received in the first wiring hole 442. The power supply 20 and the frame 30 are arranged separately and independently. The power supply 20 includes a second connecting portion 21 connected with the first connecting portion 443 through a wire 70, so as to connect the power supply 20 and the junction box 44 for providing power to the LED light board 41. The base 421 includes a second wiring hole 4211 arranged corresponding to the junction box 44, and the first sealing ring 45 arranged between a cavity wall 4442 of the middle cavity 444 and the base 421, and surrounding the second wiring hole 4211. Wires 70 connected with the LED light board 41 pass through the second wiring hole 4211 and then extend to the first connecting portion 443, and finally electrically connect to the power supply 20 through the wire 70, thereby an electrical connection between the power supply 20 and the LED light board 41 can be obtained.

In an optional embodiment of the present disclosure, the end cap 32 of the frame 30 includes a first hooking hole 321 configured to hook the first hook 50. The power supply 20 includes a second hooking hole 22 configured to hook the second hook 60.

Figure 7:
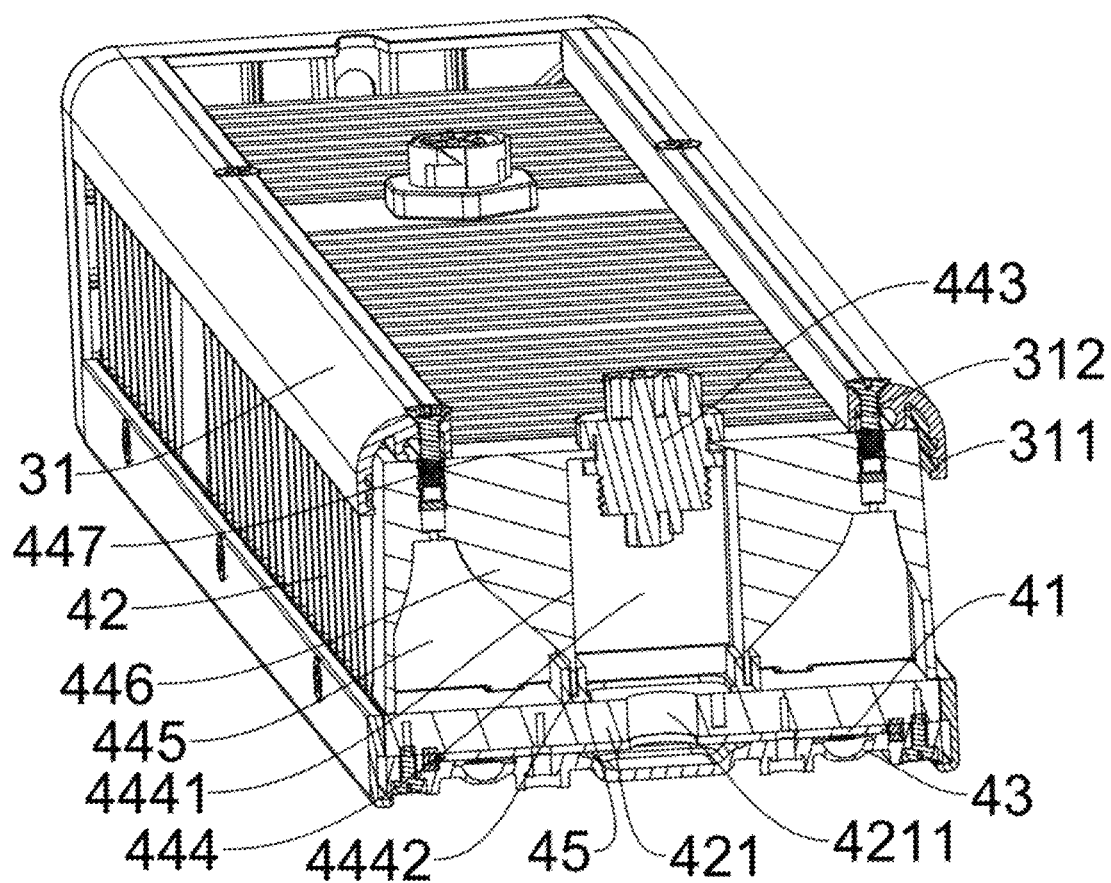
FIG. 7 is a partial cross sectional view of the LED plant growing lamp of FIG. 1.

The frame 30 and the LED module 40 of the present disclosure can be fixed with each other by screws. Referring to FIG. 7, two connecting rods 31 that are arranged at the top of the frame 30 are connected to the reinforcing rib 446 through screws. When different luminous quantities are required, the plurality of LED modules 40 can be selected, the length of the connecting rod 31 of the frame 30 can be also selected according to the number of LED modules 40, which is not necessary to re-develop a new heat sink 42, thus reducing R&D costs, achieving flexible effects, and being convenient production and assembly.

Although the features and elements of the present disclosure are described as embodiments in particular combinations, each feature or element can be used alone or in other various combinations within the principles of the present disclosure to the full extent indicated by the broad general meaning of the terms in which the appended claims are expressed. Any variation or replacement made by one of ordinary skill in the related art without departing from the spirit of the present disclosure shall fall within the protection scope of the present disclosure.

What is claimed is:

1. An LED plant growing lamp comprising: a power supply, a frame and a plurality of LED modules, each of the plurality of LED modules comprising a heat sink, an LED light board and a junction box installed on the heat sink, respectively; the frame comprising four connecting rods and two end caps, each two of the four connecting rods arranged opposite each other and connected through a corresponding end cap so that the four connecting rods are cooperatively to form a rectangular frame thereamong, and the two end caps respectively arranged at both ends of the rectangular frame; the power supply electrically connected with the junction box, and the junction box electrically connected with the LED light board; and wherein the plurality of LED modules is arranged in a row and sequentially installed on the four connecting rods in the same row, and received in the rectangular frame; and wherein the heat sink comprises a base and a plurality of cooling fins integrally connected with an upper surface of the base, the junction box installed on the upper surface of the base, and the LED light board installed on a lower surface of the base; and wherein the junction box further comprises a first wiring hole and a first connecting portion respectively arranged on a top wall of the junction box, the first connecting portion received in the first wiring hole; the power supply and the frame arranged separately and independently, the power supply comprising a second connecting portion connected to the first connecting portion through a wire;

and wherein a first sealing ring is arranged between the junction box and the heat sink; and wherein the interior of the junction box is divided into a middle cavity and two side cavities arranged on both sides of the middle cavity, the wire passing through the middle cavity and connected to the LED light board, a reinforcing rib arranged in each of the two side cavities and connected to a sidewall of the middle cavity and a top wall of the junction box.

2. The LED plant growing lamp as claimed in claim 1, wherein each of the four connecting rods is an L-shaped structure and comprises a first wall and a second wall perpendicularly connected with the first wall, both the first wall and the second wall fitted with the plurality of LED modules.

3. The LED plant growing lamp as claimed in claim 1, wherein the junction box and the base are connected with each other by screws.

4. The LED plant growing lamp as claimed in claim 1, wherein the junction box is a box body with an opening thereof, and the opening arranged towards the upper surface of the base.

5. The LED plant growing lamp as claimed in claim 1, wherein each of the plurality of LED modules comprises a lens plate covered on the LED light board and fixedly installed on the heat sink.

6. The LED plant growing lamp as claimed in claim 5, wherein a second sealing ring is arranged between the lens plate and the heat sink.

7. The LED plant growing lamp as claimed in claim 1, wherein the base comprises a second wiring hole arranged corresponding to the junction box, and the first sealing ring arranged between a cavity wall of the middle cavity and the base, and surrounding the second wiring hole.

8. The LED plant growing lamp as claimed in claim 7, wherein two of the four connecting rods that are arranged at the top of the frame are connected to the reinforcing rib through screws.

9. The LED plant growing lamp as claimed in claim 1, wherein the LED plant growing lamp further comprises a hanger rod, the frame hung on the hanger rod through at least two first hooks, the power supply hung on the hanger rod through at least two second hooks, and the frame and the power supply spaced at interval.

10. The LED plant growing lamp as claimed in claim 9, wherein each of the two end caps comprises a first hooking hole configured to hook the first hook.

\* \* \* \* \*